United States Patent
Greiner

(10) Patent No.: US 8,038,308 B2
(45) Date of Patent: Oct. 18, 2011

(54) LUMINOUS BODY

(75) Inventor: Horst Greiner, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 972 days.

(21) Appl. No.: 10/561,992

(22) PCT Filed: Jun. 16, 2004

(86) PCT No.: PCT/IB2004/050917
§ 371 (c)(1),
(2), (4) Date: May 19, 2008

(87) PCT Pub. No.: WO2005/001331
PCT Pub. Date: Jan. 6, 2005

(65) Prior Publication Data
US 2008/0225509 A1    Sep. 18, 2008

(30) Foreign Application Priority Data
Jun. 27, 2003  (EP) .................................... 03101926

(51) Int. Cl.
*F21V 9/16* (2006.01)
(52) U.S. Cl. .......... 362/84; 362/555; 362/612; 362/613; 362/97.3; 362/235
(58) Field of Classification Search ................. 362/97.3, 362/612, 613, 84, 555, 561, 235
See application file for complete search history.

(56) References Cited

U.S. PATENT DOCUMENTS

| | | | |
|---|---|---|---|
| 4,181,925 A * | 1/1980 | Burrows et al. | 362/29 |
| 4,714,983 A * | 12/1987 | Lang | 362/27 |
| 4,907,044 A * | 3/1990 | Schellhorn et al. | 257/98 |
| 5,381,309 A | 1/1995 | Borchardt | |
| 5,477,422 A | 12/1995 | Hooker et al. | |
| 5,819,454 A * | 10/1998 | Rosenitsch | 40/452 |
| 5,836,676 A * | 11/1998 | Ando et al. | 362/244 |
| 6,974,229 B2 * | 12/2005 | West et al. | 362/227 |
| 7,287,891 B1 * | 10/2007 | Park et al. | 362/555 |
| 2002/0093832 A1 * | 7/2002 | Hamilton | 362/555 |
| 2002/0140880 A1 | 10/2002 | Weindorf et al. | |

FOREIGN PATENT DOCUMENTS

| | | |
|---|---|---|
| DE | 4237107 A1 | 5/1994 |
| DE | 9410950 U1 | 11/1994 |
| DE | 10102585 A1 | 7/2002 |
| DE | 10102586 A1 | 7/2002 |

(Continued)

*Primary Examiner* — Evan Dzierzynski
(74) *Attorney, Agent, or Firm* — Mark L. Beloborodov

(57) ABSTRACT

A luminous body is described, in particular in the form of a planar illumination device for general lighting or for backlighting of displays, wherein the luminous body comprises a plurality of light sources arranged in a housing (1) such as, for example, LED elements (3, 5). The luminous body is remarkable in that the light of the light sources is radiated at least substantially in a direction parallel to a light emission surface (6) of the housing (1), while the inner walls of the housing (1) reflect the light at least partly. Not only does this render it possible to achieve a very homogeneous light distribution on the light emission surface (6) also in the case of a small constructional height of the luminous body, but the fact that no optical waveguide plate is required in the housing (1) also provides advantages in the form of a simple manufacture and low cost.

8 Claims, 1 Drawing Sheet

FOREIGN PATENT DOCUMENTS

| | | | |
|---|---|---|---|
| EP | 0072949 A1 | 3/1983 |
| EP | 1255306 A2 | 11/2002 |
| JP | 11159953 A | 6/1999 |
| JP | 2001257381 A | 9/2001 |
| JP | 2002072901 A | 3/2002 |
| WO | 0107828 A1 | 2/2001 |
| WO | 02095287 A1 | 11/2002 |

* cited by examiner

LUMINOUS BODY

The invention relates to a luminous body in particular in the form of a planar illumination device for general lighting or for backlighting of displays, which luminous body comprises a plurality of light sources such as, for example, LED elements arranged in a housing.

Planar illumination devices for the generation of mixed colors are known from DE 101 02 586.6 and DE 101 02 585.8. These illumination devices substantially comprise an optical waveguide plate in which a plurality of cavities has been provided, each cavity accommodating an LED. The cavities each have an upper side facing towards the light emission surface of the optical waveguide plate and side walls. The upper side of each cavity is coated with a reflecting layer such that the light generated by the light source inserted in the cavity is coupled into the optical waveguide plate exclusively through the side walls of the cavity. Such a "cavity-lit" arrangement achieves a homogeneous mixing and distribution of the light of each individual light source at the light emission surface of the luminous body, and thus an even illumination.

Furthermore, direct-lit arrangements are known in which the individual light sources are inserted into a common housing whose side walls are manufactured from a highly reflective material or are coated with such a material, while the upper side of the housing is covered with a difffuser layer such that the light of the light sources emerges from the diffuser layer (light emission surface) of the luminous body in a comparatively homogeneous manner.

Finally, so-called "side-slit "" arrangements are used in which the light sources are provided along side walls of an optical waveguide plate such that their light is coupled into the optical waveguide plate and propagates therein owing to total reflection at the side walls and the main surfaces perpendicular thereto. The light is then guided towards a light emission surface by means of suitable coupling-out structures at one of these main surfaces, while the other main surface is given a reflecting coating.

A general problem in all these arrangements is how to distribute the light originating from more or less point-shaped light sources as evenly as possible over the light emission surface while at the same time it is used efficiently, i.e. with reflection losses which are as low as possible.

It is accordingly an object of the invention to provide a luminous body of the kind mentioned in the opening paragraph which has as homogeneous as possible an illumination of its light emission surface in combination with a high efficiency.

Furthermore, a luminous body of the kind mentioned in the opening paragraph is to be provided which has a very homogeneous illumination of its light emission surface also when realized as a planar light source with a small constructional depth.

Finally, a luminous body is to be provided with which light having a desired color can be generated, and in particular having a high homogeneity and evenness as regards the color and brightness of the light also in the case of a larger light emission surface.

The object is achieved according to claim 1 by means of a luminous body with a housing having a light emission surface and a plurality of light sources arranged in the housing whose light is radiated at least substantially in a direction parallel to the light emission surface, wherein inner walls of the housing reflect the light at least partly.

An advantage of this solution is that no optical waveguide plate is required, whereby the manufacture is simplified and costs are reduced.

A further advantage of this solution is that the ratio between a desired (i.e. in general as small as possible) constructional depth and the distances between the light sources (which is to be reduced correspondingly so as to achieve a homogeneous light distribution as the constructional depth decreases) can be made substantially smaller in comparison with known arrangements of this type.

This means, for example, that the distance between the light sources can be made greater than in known luminous bodies, for a given constructional depth and size of the luminous body, so that a smaller number of light sources is required for achieving the same homogeneity in the light distribution. A considerable cost saving can be achieved also by these means.

The dimensions of the luminous body according to the invention may substantially be chosen as desired, so that not only a small constructional depth, but also a very large light emission surface can be realized. A desired luminous intensity can be achieved through a suitable choice of the number of light sources per unit surface area.

A further essential advantage is that the light of each individual light source is distributed over a wider region around the relevant light source and mixes with the light of a larger number of adjoining light sources, so that there is no appreciable dependence of the coupled-out light on the specific properties of the individual light sources such as, for example, fluctuations in their luminous intensity or their color properties.

Finally, the reflections at a flat angle of incidence lead to only small reflection losses, so that a very high proportion of the light provided by each light source is available at the light emission surface, which makes the efficiency of the luminous body high.

The dependent claims relate to advantageous further embodiments of the invention.

Claims 2 and 3 relate to light sources which are preferably used because of their optical and electrical properties.

The mounting method of claim 4 and additional reflecting coatings as claimed in claims 5 and 6 are capable of improving the homogeneity of the light distribution on the light emission surface further.

The embodiments of the light emission surface as claimed in claims 7 and 8 also have this advantage.

The embodiment of claim 9 serves for the simple generation of colored light, whereas the embodiment of claim 10 is capable of achieving a given spatial radiation characteristic of the luminous body.

Further details, features, and advantages of the invention will become apparent from the ensuing description of preferred embodiments which is given with reference to the drawing, in which:

FIG. 1 is a diagrammatic cross-sectional view of a luminous body according to the invention in the form of a substantially planar or flat light source.

Figure 1:
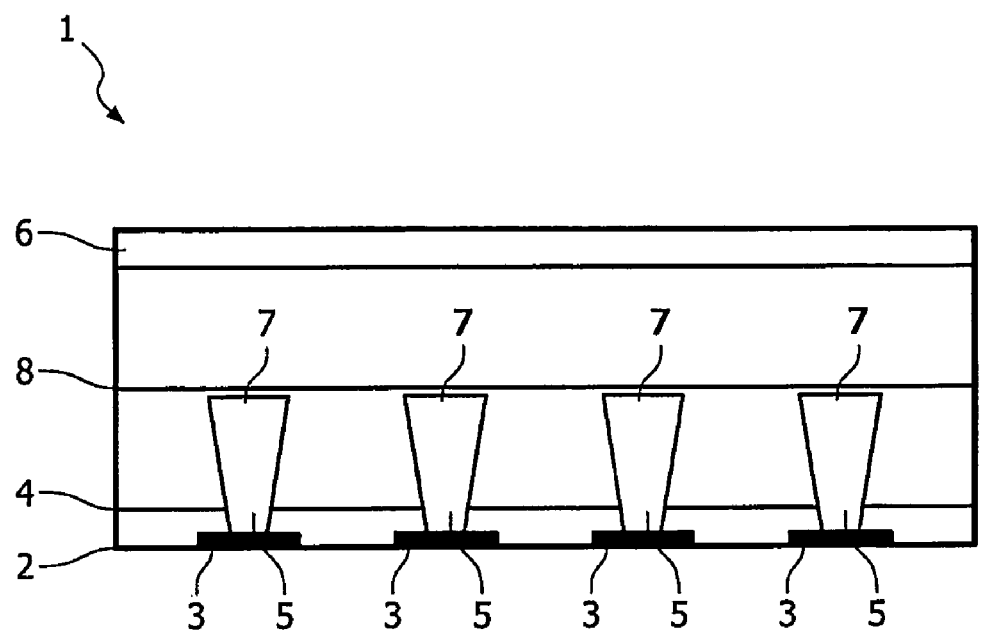
FIG. 1 is a diagrammatic cross-sectional view of a luminous body according to the invention.

The luminous body comprises a housing 1 which has a depth, for example, of approximately 10 to 15 mm and whose length and width correspond to the desired size of the planar light source, such that the light is issued at a light emission surface 6 which closes off the housing 1 at its upper side.

At the lower side of the housing 1 opposed to the upper side, there is a bottom surface 2 into which a plurality of light sources 3, 5 has been inserted. The light sources 3, 5 are fastened to the bottom surface 2 and contacted in a usual manner. The light sources 3, 5 are chosen and arranged such here that they radiate light at least substantially only in lateral direction, i.e. in the direction of the length and/or width of the luminous body.

The light sources 3, 5 used are preferably LEDs emitting in lateral directions, whose light emission is substantially perpendicular to the axis of the LED housing. In the present case, the light sources are composed of the actual LED elements 3 with electrical contacts and respective lens bodies 5 provided thereon, from which the light is issued in lateral directions.

LEDs of this kind are known and are generally available, for example with an electric power of 1 and 5 W and in the colors blue, green, red, and white.

The bottom region in which the LED elements 3 are present is covered by a cover plate 4. The cover plate 4 has openings through which the lens bodies 5 extend in the direction towards the upper side of the housing 1. This means that the light generated by the LED elements can only enter the region above the cover plate 4 of the housing 1 through the lens bodies 5.

The surfaces of the lens bodies 5 facing (opposed to) the light emission surface 6 of the housing 1 are each coated with a reflecting layer 7 which reflects back those light components which are inevitably also radiated in axial direction of the LED elements (in general, for example, 10% of the total luminous intensity) and which prevents these light components from hitting the light emission surface 6 directly. The layer 7 preferably reflects on both sides.

Alternatively, an intermediate layer 8 may be present in the housing for this purpose, which layer extends over the lens bodies 5 and is formed from a material that preferably reflects on both sides in the region of an upper end of a lens body 5 each time, or is coated with such a material.

The light emission surface 6 of the luminous body, finally, is formed by a diffuser plate, i.e. for example a semi-transparent, diffusely scattering plate whose transmittance lies preferably below 50%, which transmittance, however, may also be locally variable.

An essential criterion for the choice of the transmittance is the fact that the lens bodies 5 or their upper sides must not be perceivable through the light emission surface 6, in particular when the light sources are switched on, neither in the shape of a bright region, nor in that of a dark region. For this purpose, the transmittance may also be locally different and, for example, be reduced in the regions above the lens bodies 5. The choice of the transmittance is obviously also dependent on the constructional depth of the luminous body.

The upper side of the cover plate 4 and the inner walls of the housing 1 are preferably coated with a diffusely highly reflecting material.

Otherwise, the housing 1 contains preferably air or some other gas.

Figure 2:
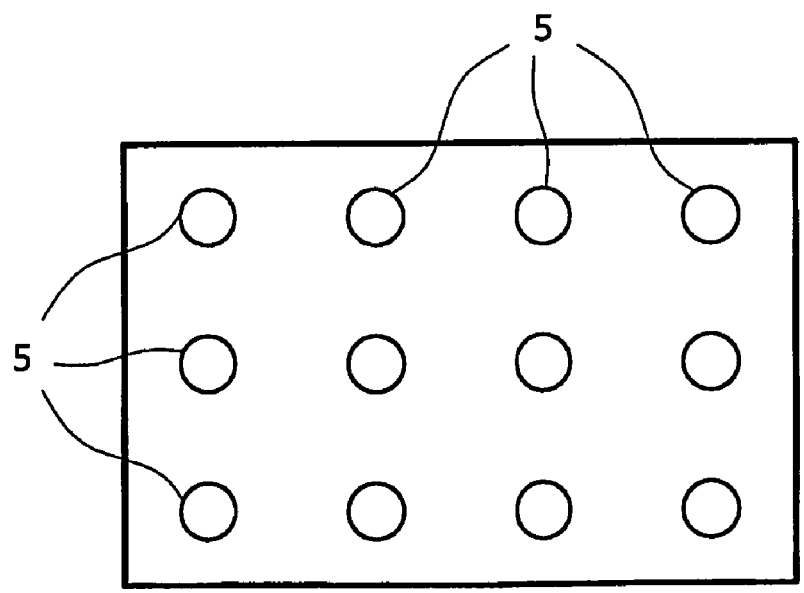
FIG. 2 is a diagrammatic plan view of the luminous body of FIG. 1.

FIG. 2 is a plan view of such a luminous body, where the light emission surface 6 or the plate representing this has been removed so as to render the arrangement of the light sources (in this case the lens bodies 5) visible.

As is apparent from this Figure, the light sources are regularly distributed over the bottom surface 2, preferably having interspacings of between approximately 1 and 5 cm in the case of use of the LEDs mentioned above.

This arrangement renders it possible to realize a planar radiator with a very high homogeneity of the light distribution over the light emission surface 6 also in the case of a small constructional depth (i.e. the distance between the cover plate 4 and the light emission surface 6) of, for example, 10 to 15 mm and a comparatively great distance between the individual light sources 3, 5 of, for example, 1 to 5 cm. Experiments have shown that an average intensity deviation of the light on the light emission surface 6 of well below 10% can be achieved without any problems. In particular, the distance between the individual LEDs is allowed to be approximately 3 to 5 times the constructional depth of the luminous body.

The generated light is mainly reflected at the upper side of the cover plate 4 and the lower side of the light emission surface 6 owing to the lateral emission of the light from the light sources, i.e. with a flat angle of incidence each time, such that particularly low reflection losses occur and a good light distribution is achieved in particular in lateral direction, which leads to a high efficiency and to a high homogeneity at the light emission surface 6.

The inventive combination of laterally emitting light sources with a "direct-lit" housing as explained above renders it possible in particular to achieve such a high homogeneity that a modulation of the transmittance of the light emission surface or the diffuser plate 6 arranged therebelow and forming this surface is not necessary.

Experiments have shown that luminance values of the luminous body of up to 20,000 $cd/m^2$ can be achieved with commercially available LEDs. If known white LEDs with an electric power of 1 W are used, these luminance values lie at approximately 4000 $cd/m^2$.

This renders it possible without question to fulfill the usual requirements for luminous tiles for interior lighting, which requirements lie between approximately 2000 and 3000 $cd/m^2$. This is true even for an LCD display backlighting application, for which usually 5000 to 15,000 $cd/m^2$ is required, or for phototherapy applications.

The luminous body according to the invention is substantially scalable as desired, i.e. luminous surfaces of practically any size desired can be realized. The good lateral light distribution averages out the intensity differences among the individual light sources. When light sources of different colors, for example with red, green, blue, or white light, are regularly arranged, therefore, a very well controllable color mixing can be achieved.

The semi-transparent diffuser plate 8 may also be realized with a color-converting phosphor, which converts blue light partly into light of a longer wavelength, if light sources with blue light are used.

It is possible in this manner to realize light sources of substantially any color without the necessity of introducing the phosphor used for color change into the light sources themselves, in particular into the LEDs. Life and efficiency problems can be avoided thereby in particular in the case of highly loaded LEDs.

The light color may in addition be changed through a simple replacement of the diffuser plate 6.

The spatial radiation characteristic of the luminous body is essentially determined by the shape and gradient of the light emission surface and usually has a Lambert-type character.

The light emission surface may alternatively be covered with optical foils which transmit light only in certain angular regions and reflect it in other angular regions, so that a planar light source with a different radiation characteristic can be realized such as is required, for example, for certain applications (office lighting). The light not transmitted is not lost, but is reflected back into the luminous body.

Finally, a (sequential) switching on and off of individual groups or strips of LEDs renders it possible also to realize moving background illumination effects which are used, for example, in LCD-TV displays.

The invention claimed is:

1. A luminous body comprising:
    a housing having a bottom surface, inner walls and a light emission surface; and
    a plurality of light sources arranged in the housing and configured to radiate light in a direction substantially parallel to the light emission surface,
        wherein the inner walls reflect the light at least partly,
        wherein each light source comprises an LED element and a lens body provided thereon to emit the light substantially in a direction perpendicular to an axis of the LED element, and
        wherein the LED elements are inserted into the bottom surface such that the lens bodies extend through a cover plate arranged over the bottom surface.

2. A luminous body as claimed in claim 1, wherein the light sources are laterally emitting LEDs.

3. A luminous body as claimed in claim 1, wherein surfaces of the lens bodies facing the light emission surface include a coating which reflects light components issuing from said bodies at least substantially.

4. A luminous body as claimed in claim 1, further comprising an intermediate layer extending over the lens bodies and having a coating in regions of the surfaces of the lens bodies facing the light emission surface, which coating reflects light components issuing from said bodies at least substantially.

5. A luminous body as claimed in claim 1, wherein the light emission surface is formed by a partly transparent, diffusely scattering diffuser plate.

6. A luminous body as claimed in claim 5, wherein transmittance of the diffuser plate is reduced in those regions which lie opposite the lens bodies.

7. A luminous body as claimed in claim 5, wherein the diffuser plate comprises a phosphor material for converting the color of the light passing through.

8. A luminous body as claimed in claim 5, wherein the light emission surface is covered with an optical foil which allows light to pass through substantially only within certain angular regions.

* * * * *